June 26, 1962  A. WEBER  3,041,423
CONTACTOR
Filed Dec. 1, 1959  3 Sheets-Sheet 1
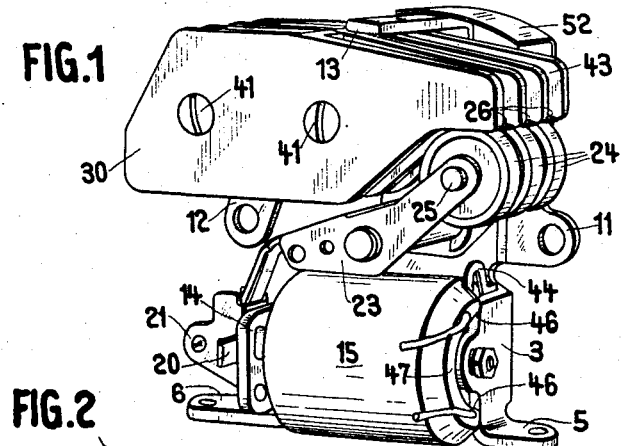
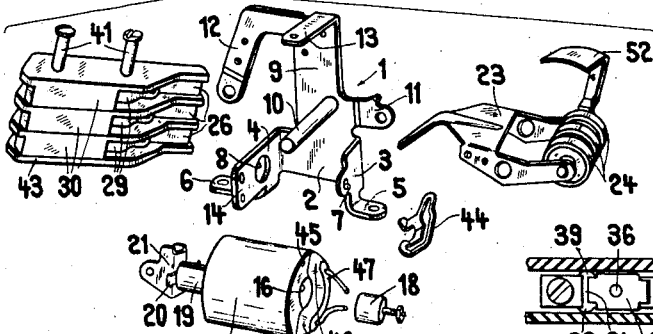
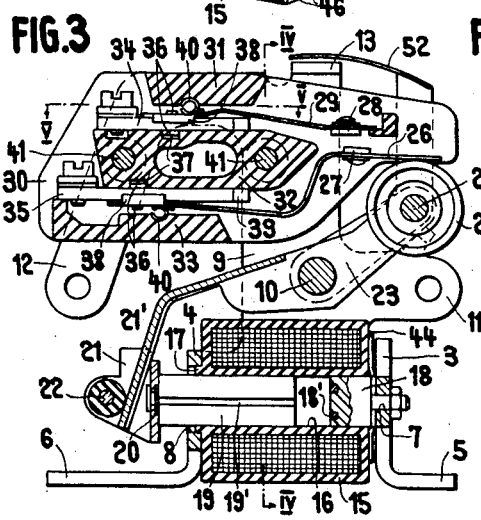
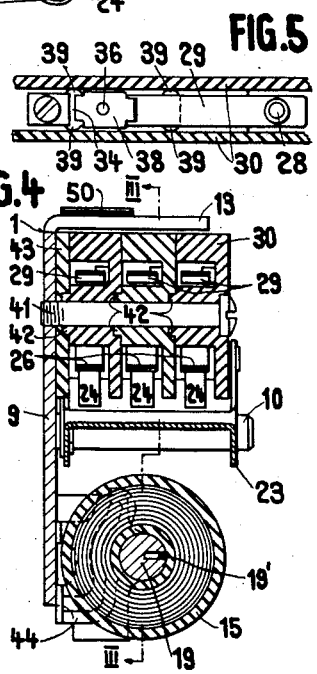
INVENTOR
Artur Weber
BY
ATTORNEY

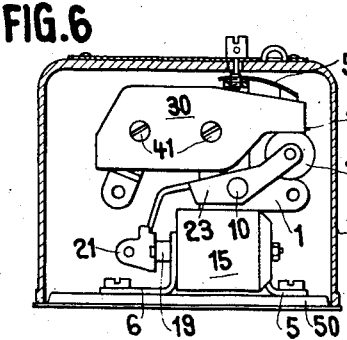
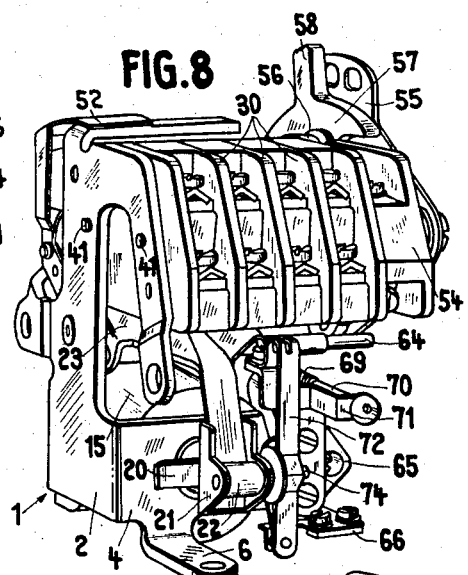
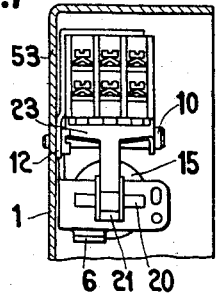
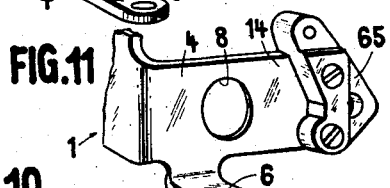
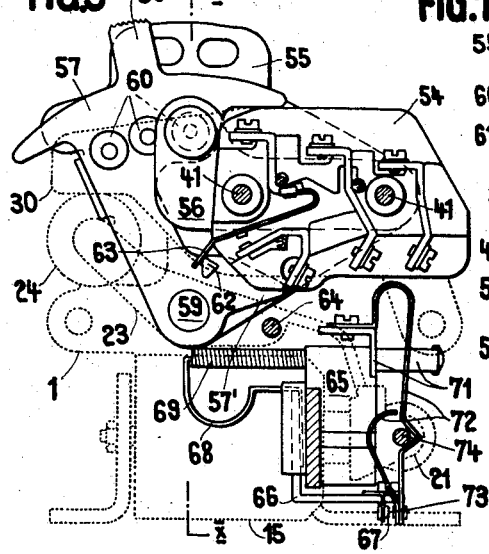
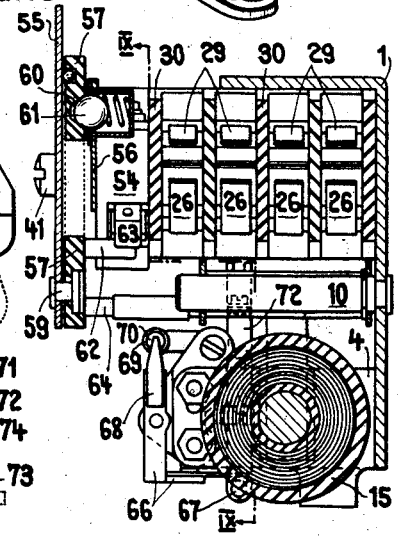

June 26, 1962     A. WEBER     3,041,423
CONTACTOR
Filed Dec. 1, 1959     3 Sheets-Sheet 3
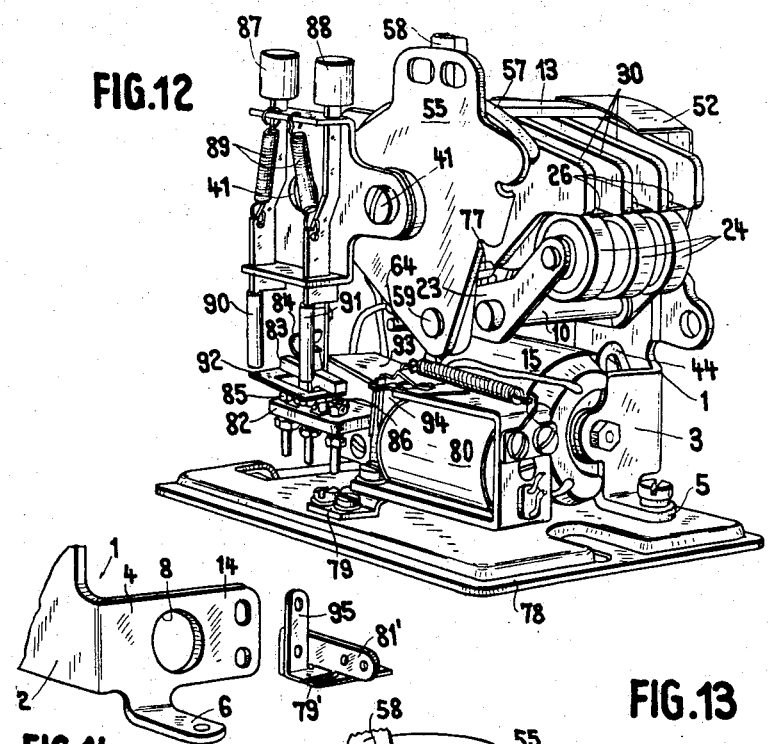
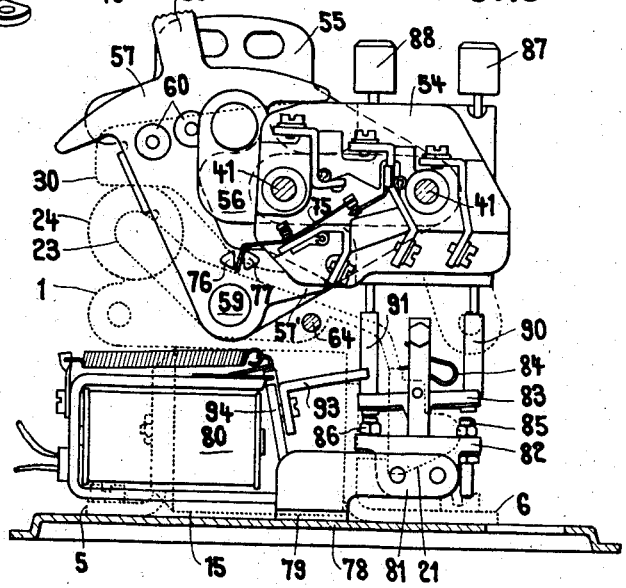
INVENTOR
Artur Weber
BY
ATTORNEY

United States Patent Office 3,041,423
Patented June 26, 1962

3,041,423
CONTACTOR
Artur Weber, Muri, near Bern, Switzerland, assignor to
Saia A.G., Murten, Switzerland
Filed Dec. 1, 1959, Ser. No. 856,597
8 Claims. (Cl. 200—104)

This invention relates to a contactor of the type having a solenoid-operated armature and switch contacts operable by the said armature.

It is a first object of the invention to provide a contactor of this type of high simplicity in construction, manufacture and operation, this object being obtained by a particular design of core means for the solenoid.

It is a further object of the invention, to provide, equally by special design of the core structure, high versatility of use of the contactor in various positions and applications.

Another object of this invention is to provide a contactor which may easily be assembled with auxiliary equipment such as auxiliary terminal boxes, auxiliary relays and contacts or other auxiliary elements, this object being substantially achieved by special design of the core structure of the contactor.

These and other objects and features of the invention will be apparent from the following description and from the attached drawings, showing, by way of example, one embodiment of the invention without and with special auxiliary equipment.

FIG. 1 is a perspective side view of the contactor,

FIG. 2 illustrates the essential parts of the contactor in separate perspective views, FIGS. 3 and 4 are sectional views of the contactor on lines III—III and IV—IV in FIGS. 4 and 3 respectively, FIG. 5 is a partial section along line V—V in FIG. 3, FIG. 6 is a schematical side view of the contactor as accommodated in an individual contactor casing, FIG. 7 is a schematical end view of the contactor as accommodated in a switch-board casing, FIG. 8 is a perspective view of the contactor equipped with a thermistor, FIG. 9 is a side view of the modification shown in FIG. 8, FIG. 10 is a sectional view on line X—X in FIG. 9, FIG. 11 is a perspective illustration of an attachment of the contactor, FIG. 12 is a perspective view of another modification of the contactor equipped with auxiliary switches and with auxiliary relay means, FIG. 13 is a side view of the modification shown in FIG. 12 and FIG. 14 is a perspective illustration of the attachments of the auxiliary equipment shown in FIG. 13.

Having now reference to FIGS. 1 and 2, the contactor has a stamped core 1 of sheet material serving not only as a fixing means for all parts of the contactor but also for attaching the assembled contactor to any base such as a switch-board, into a casing or the like. The lower part of the core 1 forms a substantially U-shaped core portion having a web portion 2 and two parallel leg portions 3 and 4. Fixing lugs 5 and 6 extend downwards from legs 3 and 4 and are provided with fixing holes in their outwardly bent end portions. A relatively small fixing hole 7 is provided in leg portion 3 and a larger hole 8 is provided in the other leg portion 4 in a position substantially coaxial with hole 7.

Web portion 2 of the core is upwardly extended and forms a side wall or back wall 9 of the core. A pivot axis 10 is riveted to the side wall 9. The side wall 9 has extensions 11 and 12 substantially in the plane of the side wall, such extensions being shaped as shown in the drawing. The extremities of such extensions are slightly displaced outwards during one of the stamping processes required for manufacture of the core and such extremities are provided with fixing holes. A further extension 13 projects inwardly from the upper end of the side wall 9 in a direction substantially perpendicular to the side wall. While the hole 7 is located substantially at the extremity of leg portion 3, leg portion 4 is extended beyond hole 8 and forms an attachment 14 having two fixing holes serving a purpose explained below.

An exciting solenoid 15 as generally shown in FIG. 2 and as shown in section on a larger scale in FIGS. 3 and 4 is adapted for insertion between leg portions 3 and 4. The solenoid is of the type having a completely sealed shell of insulating material, an axial bore 16 being provided in this shell and a small projecting shoulder 17 being formed at one end face of the solenoid, the external diameter of this shoulder being so that it fits into the hole 8 of leg portion 4 practically without play. A cylindrical pole piece 18 is provided having a fixing screw for being mounted in the hole 7 of leg portion 3 as shown in FIG. 3.

An armature 19 may slidably be inserted into the bore 16 of solenoid 15, no guiding means other than bore 16 for the axially displaceable armature being required. A leaf spring 20 and motion-transmitting bracket 21 of U-shaped cross section are riveted to the end of the armature projecting from the solenoid. An actuating roller 22, for instance of nylon is mounted between the legs of bracket 21.

An actuating lever 23 of a design best seen in FIG. 2 and made of one single stamped piece is pivoted on the pivot axis 10. The lower, narrow end of lever 23 is engaged between the legs of bracket 21 and will be actuated by roller 22 when the armature 19 is axially displaced. The other end of lever 23 has the shape of a fork and three actuating rollers 24 of insulating material are rotatably mounted on a common axle 25. When the armature 19 is axially displaced the actuating lever 23 is rotated round its pivot axis 10 and the rollers 24 are displaced upwards whereby lower contact springs 26 continuously contacting rollers 24 by resilience are displaced in vertical direction (FIG. 3) so that their contact pieces 27 will engage contact pieces 28 of upper contact springs 29.

As may be seen from FIGS. 1 to 4 each pair of contact springs 26 and 29 is mounted in an individual contact carrier of insulating material, this contact carrier having a side wall 30, serving as a spark-separating wall when assembled with other similar contact carriers. Each of the contact carriers has cams 31, 32 and 33 of the form shown in FIG. 3, projecting at one side of wall 30 and forming between each other grooves or canals having a depth and width suitable for accommodation of the contact springs 26 and 29 and of terminal pieces 34 and 35 assembled therewith. Each of the contact assemblies consisting of contact spring 26 and terminal piece 35 or contact spring 29 and terminal piece 34 respectively, is interconnected by means of one single rivet 36, whereby the inner head of each rivet engages one of two recesses 37 of cam 32 thereby preventing longitudinal displacement of the contact assembly in the groove. A U-shaped piece 38 of sheet material engaging the edges of the contact spring and of the terminal piece with its legs, is fixed on each contact assembly by means of rivet 36 and serves for maintaining the contact spring and terminal piece in parallel position in spite of the interconnection of these parts in only one place by only one rivet. As seen particularly from FIG. 5, the width of the contact spring and of most portions of the terminal piece are somewhat smaller than the width of the groove in which those parts are inserted so that the contact spring will not usually contact the spark walls 30 and may therefore freely be displaced between the latter. However, the terminal pieces 34 and 35 have each two widened places formed by symmetrically projecting lateral bosses or lugs 39 (FIG. 5), such widened portions having a width practically equal to the width of the groove and the distance between spark walls 30 respectively, so that such widened portions will contact walls 30 and will maintain the terminal pieces and consequently the contact springs in a strictly parallel and symmetrical position between walls 30 so that contact between the contact springs and the side walls, which might injure proper operation of the contact springs, is effectively avoided. Each contact assembly comprising a contact spring, a terminal piece and a piece 38 is firmly maintained in contact with cam 32 by means of a resilient locking sleeve 40 engaging a groove in cam 31 and cam 33 respectively.

As seen from FIGS. 1, 2 and 4 three contact carriers equipped with contact springs 26 and 29 are piled upon each other and attached to the upper portion of side wall 9 of the core by means of screws 41 passing through appropriate holes of the contact carriers and anchored in threaded holes of side wall 9. Annular projections 42 (FIG. 4) surrounding the fixing holes of each contact carrier engage annular recesses of the adjacent contact carrier so that the relative position of such contact carriers is well determined. The innermost contact carrier is separated from the side wall 9 by means of a flat separating wall 43 of insulating material having also annular recesses for taking up the annular projections 42 of the adjacent contact carrier. Small pins or bolts of material 43' may extend into holes of side wall 9 as indicated in pointed lines in FIG. 4, for accurately determining the position of the pile of contact carriers relatively to side wall 9.

Manufacture and assembling of the contactor are particularly economic and simple. The core 1 may be stamped in a few operations, whereupon a few holes have to be screw threaded and the pivot axis 10 may be riveted to it. All the other parts including the solenoid body may be produced by stamping, casting, pressing or other similar work-saving operations. Insertion of the prepared contact assemblies into the contact carriers is extremely simple in that one single pressure sleeve 40 is to be inserted for mounting each contact assembly. The solenoid is first inserted with its shoulder 17 into the hole 8 of leg portion 4. Pole piece 18 is subsequently slid through hole 8 and bore 16 of the solenoid until its fixing screw enters into fixing hole 7 of lug portion 3. The pole piece is now fixed to leg portion 3 by means of a nut, whereupon a resilient leaf spring portion 44 is forced between leg portion 3 and a flat end-face portion 45 of the solenoid, this spring portion 44 preventing further axial displacement of the solenoid between leg portions 3 and 4. A shoulder 46 is formed between the flat face portion 45 and a higher end portion 47, this shoulder 46 engaging edge portions of leg portion 3 thereby avoiding angular displacement of the solenoid between leg portions 3 and 4. Therefore, the solenoid is fixed in the contactor core in a very simple and reliable manner.

It will be seen from the drawing and the foregoing description that the outer end position of armature 19 is not determined by a stop but that further motion in this direction is prevented by the end of lever 23 engaging between roller 22 and the web portion of bracket 21. As seen from FIG. 3, further displacement of the armature and of bracket 21 to the left would result in further rotation of the lever 23 in clockwise direction, whereby the lower lever end would be jammed between roller 22 and an edge 21' of bracket 21 thereby avoiding further rotation of lever 23 and further outward displacement of armature 19. The end of the inward displacement of armature 19 is limited by the engagement with pole piece 18, the impact of armature 19 against pole piece 18 being somewhat reduced by leaf spring 20 which first contacts the leg portion 4. Since the diameter of armature 19 is substantially smaller than hole 8, a substantial reduction of the magnetic reluctance of the magnetic circuit formed through pole piece 18, leg portion 3, web portion 2, leg portion 4 and armature 19 is substantially reduced and therefore the A.C. power consumption of solenoid 19 is substantially reduced when the armature is in its attracted position and the air gap formed between leg portion 4 and armature 19 is bridged by the bracket 21 which is maintained at a very small distance in the order of $3/10$ to $4/10$ of a millimeter from the outer face of leg portion 4. It was found that for a contactor for operation at a nominal rate of 10 to 15 amps. an initial consumption of 4 va. by solenoid 15 is obtained when the armature is in off-position, whereas a current consumption of 0.2 va. only was obtained when the armature is attracted. For A.C. operation, measures may be taken for avoiding excessive hum and eddy-current losses. For example, a short-circuiting ring may be inserted into the face of pole piece 18 in any well known, for instance concentric manner as indicated at 18' in FIG. 3, and armature 19 may have a longitudinal groove 19' as shown in FIGS. 2, 3 and 4.

Operation of the contactor is very simple. When the solenoid 15 is deenergized actuating lever 23 is maintained in an end position as shown in FIG. 3 by the resiliency of contact springs 26, the armature 19 being thereby maintained in the left end position by lever 23 as explained above. The main circuit of the contactor is broken between contact pieces 27 and 28 of contact springs 26 and 29. When the solenoid 15 is excited armature 19 is pulled to the right in FIG. 3, actuating lever 23 is rotated anticlockwise and the lower contact springs 26 are urged upwards so that the main contact circuit or circuits are closed by contact pieces 27 and 28.

As already set above, core 1 forms a single integral piece serving as a magnetic core portion and as a mounting structure for all parts of the contactor. It further serves for fixing the contactor on any base in different relative positions. Therefore, part 1 equally serves as a magnetic core and as a mechanical supporting and mounting structure. Since this part might be said to be a mechanical and magnetic core of the contactor, the term core is used throughout the foregoing and following specification and in the attached claims.

FIGS. 6 and 7 show, by way of example, in which way the contactor may be attached to supporting structures. In FIG. 6 the contactor is screwed to a base 50 with its fixing lugs 5 and 6 respectively, and to a cover 51 by means of its extension 13. An indicating flap 52 is attached to the actuating lever 23 for indication of the contactor position through a window of the cover 51, not shown in FIG. 6.

In FIG. 7 the contactor is mounted on the back wall of a switch board 53 by means of its extensions 11 and 12. Since the extremities of such extensions are somewhat displaced rearwardly from the plane of side wall 9 of the core 1, the contactor is somewhat spaced from the back wall of the switch board 53.

As mentioned above, the contactor is particularly suitable for being assembled with auxiliary equipment. One modification of the contactor equipped with auxiliary switches and a thermistor for delay operation of the contactor is shown in FIGS. 8 to 11. The contactor per se is similar to the one shown in FIGS. 1 to 5, but it has four contact carriers instead of three. A terminal and contact carrier 54 and two parallel metal plates 55 and 56 are fixed outside the usual contact carriers 30–33 by means of the fixing screws 41. An actuating member 57 having a hand-operating projection 58 is pivoted at 59 on plate 55 and has three similar conical recesses 60 at its inner side facing plate 56. A spring loaded ball 61 accommodated in a casing fixed on plate 56 engages one of recesses 60 thereby determining the position of actuating member 57, but allowing shifting of this member from one position to another by hand operation. The actuating member 57 has a lateral control projection 62 adapted to engage a contact spring 63 anchored in contact carrier 54 by means of a resilient pressure sleeve in the manner set out above for the main contacts of the contactor. Actuating member 57 has a lower control edge 57' (at the right of its pivot place 59 in FIG. 9), adapted for cooperation with a rod 64 fixed in the actuating lever 23 (shown in pointed lines in FIG. 9) of the contactor. In order to reduce friction between plate 55 and actuating member 57, at least one ball is inserted between such parts as shown in FIG. 10.

A supporting body 65 of insulating material is fixed to attachment lug 14 (FIG. 2) of the contactor core. A contact bracket 66 of relatively complex shape as shown in FIGS. 8, 9 and 10 having at its ends a contact piece 67 and a supporting spring 68, respectively, is fixed on the supporting body 65. A coil spring 69 is supported with one end by the said supporting spring 68 and fits with its other end on a rod 70 of a material having a negative temperature coefficient of electrical resistance, the other end of this thermistor rod being mechanically and electrically connected to another terminal structure 71 fixed on the supporting body 65. A contact spring 72 of the shape shown in FIG. 9 is mechanically and electrically connected to the terminal structure 71 and has a contact piece 73 cooperating with the stationary contact piece 67. A lateral extension 74 of the axis of actuating roller 22, made of insulating material, engages the contact spring 72 for actuating it in a manner set out below.

It is seen that in this way, a substantial amount of auxiliary equipment may be mounted on the contactor without substantially departing from its base structure. With this auxiliary equipment as shown in FIGS. 8 to 11 it is still possible to accommodate the contactor in different positions as shown in FIGS. 6 and 7 either by means of its fixing lugs 5 and 6 or by means of its fixing extensions 11 and 12.

Operation of the contactor with the auxiliary equipment shown in FIGS. 8 to 11 does not constitute per se an object of this invention, but is summarized below for improving the understanding of the invention.

The switch comprising contact spring 63 is connected into the main exciting circuit of contactor solenoid 15. Therefore, when the actuating member 57 is in its position shown in FIG. 9, the contactor cannot be closed by exciting its solenoid. When the actuating member 57 is in its medium position the switch comprising contact spring 63 is closed and the contactor solenoid may be excited through thermistor 70. When this thermistor is cold its resistance is too high and the exciting current too low for immediately completely actuating the contactor. However, the thermistor is gradually heated up by the exciting current so that its resistance value gradually decreases until the exciting current is sufficient for operating the contactor, whereby contacts 67 and 73 are closed, thereby bridging thermistor 70. The delay of contactor operation may be adjusted as desired by suitable adjustment of thermistor 70. When the actuating member 57 is completely turned to the right in FIG. 9, the control edge 57' of the actuating member will engage and displace downwards the rod 64, whereby the actuating lever 23 of the contactor is pivoted to close the main contacts of the contactor. By this means the contactor may continuously be closed manually without exciting the contactor solenoid.

Another modification of the contactor by addition of further auxiliary equipment is shown in FIGS. 12 to 14, wherein corresponding parts are similarly designated as in FIGS. 8 to 11. The additional terminal and contact carrier 54 differs in that its displaceable contact spring 75 cooperates with two stationary contacts of a change-over switch. The outer end of contact spring 75 enters between two control projections 76 and 77 of the actuating member 57.

The contactor is screwed to a base 78 by means of its lugs 5 and 6. A mounting piece 79 is further screwed to the base, having a flat portion parallel to the base carrying an auxiliary relay 80 and a fixing lug 81 substantially perpendicular to the base for carrying an auxiliary switch structure 82. This switch has a switch lever 83 which is maintained in any of its inclined closed positions by a snap spring 84 well known in the art, so that the switch lever 83 is stable in two different positions wherein it contacts terminals 85 or 86 respectively. The switch lever 83 may be changed over from the one to the other position by pressure upon the one or other of two actuating knobs 87 and 88 respectively. Upon downward displacement of any of these knobs against the pull of resetting springs 89, one of two actuating pieces 90 or 91 respectively of insulating material is displaced downwards against an actuating frame 92 fixed on the switch lever 83. Actuating knob 87 and actuating piece 90 respectively would have to be operated for reversing the switch lever 83 from the position shown in FIG. 13 into its other position. Auxiliary relay 80 has a flap 93 of insulating material on its spring loaded armature 94, and on operation of this relay, its flap 93 will always return switch lever 83 into the position shown in FIG. 13.

Again it is shown that the contactor may be equipped with a great number of individual auxiliary elements without being changed appreciably.

Operation of the contactor as shown in FIGS. 12 and 13, may be as follows: Contact spring 75 is connected to the contactor solenoid 15. When the actuating member 57 is in its position shown in FIG. 13, the contactor assembly is adapted for electric control by means of relay 80 and switch 82. For this end switch lever 83 is connected in series with contact spring 75 and with solenoid 15 respectively, and switch terminals 85 and 86 are connected to remote-control station, for instance a power station. When terminal 86 is energized, the contactor is operative as long as switch lever 83 is in the position shown in FIG. 13. Further, relay 80 is always energized when terminal 86 is energized so that the contactor is always automatically closed when terminal 86 is energized, because switch lever 83 is automatically thrown into the position illustrated in FIG. 13 whenever relay 80 is energized. When terminal 86 is deenergized but terminal 85 is energized, the contactor solenoid is energized as long as switch lever 83 is thrown into contact with terminal 85 by pressure upon actuating knob 87. Therefore, for this position of the actuating member 57 the contactor is always closed when terminal 86 is energized, the contactor may intentionally be closed when terminal 85 is energized and the contactor is deenergized when none of terminals 85 or 86 is energized by remote control.

When the actuating member 57 is turned to its medium position, contact spring 75 is completely separated from its associated contacts and therefore the contactor cannot be energized. This is the out-position or neutral position of the contactor.

When the actuating member 57 is turned to its right-hand position in FIG. 13, the contactor is mechanically closed independent from any electric control. This position may be used upon failure of the remote control system or for overriding the remote control system.

The modification of the contactor shown in FIGS. 12 and 13 has to be mounted on a base plate 78 because this base also carries the relay 80 and a part of switch 82. It may be desirable to attach all parts of the contactor assembly to the contactor core 1 in order to be able to use the contactor with or without a base plate 78. This is possible when a mounting piece 79' of the type shown in FIG. 14 is used instead of the mounting piece 79 shown in FIGS. 12 and 13, this modified mounting piece 79' having a lug 95 adapted for being attached to the attachment 14 of leg portion 4 of the contactor core. The mounting piece 79' has a further lug 81' for mounting switch portion 82 and a plate portion 96 for mounting relay 80. Therefore, all auxiliary elements may be mounted on the contactor so that the contactor may be used in any desired application, for instance those shown in FIGS. 6 and 7.

Of course the core 1 of the contactor may be modified. Further extensions may be provided when required for attaching further parts of the contactor or for allowing a still other way of mounting the contactor on a base.

It is a particular feature of the invention that the contactor core has a substantially flat side wall 9 wherefrom the other core portions only extend to one side, so that the side wall of the core also forms a side wall of the completed contactor.

Although this invention has been described and illustrated with reference to specific embodiments thereof, it will be understood that other embodiments may be resorted to without departing from the invention. Therefore, the forms of the invention set out above should be considered as illustrative and not as limiting the scope of the following claims.

What I claim is:

1. A contactor comprising an exciting solenoid of substantially cylindrical form having opposite end faces, stationary core means comprising one single thickness and one single piece of stamped magnetizable sheet material, a substantially U-shaped core portion enclosing the said solenoid and having leg portions each adjacent one of the said end faces of the solenoid and a web portion interconnecting the said leg portions and extending laterally and substantially longitudinally of the said solenoid, air gap means between one of the said leg portions and the said solenoid and an armature displaceable in the said air gap means, contacts operable by the said armature, a magnetic circuit in a plane comprising substantially the said solenoid the said leg portions and the said web portion, the said stationary core means having first mounting means extending from and integral with the said U-shaped core portion, the said first mounting means being substantially in a common plane with the said web portion, and second mounting means in a plane perpendicular to the said web portion and first mounting means respectively, the said magnetic circuit, the said armature and the said contacts being accommodated in a space limited by the said first and second mounting means, it being thereby possible, to attach the contactor to a base in two different positions by means of the said first and second mounting means respectively.

2. A contactor of the type described and having stationary core means of magnetizable sheet metal, a substantially U-shaped core portion having two opposite substantailly parallel leg portions, an actuating solenoid having opposite end faces, an axial bore in the said solenoid, a pole piece extending inward from one of the said leg portions into the said bore of the solenoid inserted between the leg portions, a hole coaxial to the said pole piece in the other leg portion, an annular shoulder at one end face of the solenoid engaging the said hole, the solenoid being thereby maintained between the said leg portions by the said bore engaging the pole piece and the said shoulder engaging the bore respectively, and an armature extending and axially displaceable through the said hole of the said other leg portion and axial bore of the solenoid respectively, an air gap being defined between the said core and other leg portion by the said annular shoulder and spring means removably inserted between the said one leg portion and the said solenoid for maintaining the said shoulder in engagement with the said hole, thereby defining the axial position of the solenoid.

3. A contactor of the type described and having magnet core means, an actuating solenoid and at least one pair of switch contacts operable by a magnet armature, each pair of switch contacts being mounted in a contact carrier of insulating material, the said carrier having a substantially flat spark-separating wall portion and cam portions laterally projecting from this wall portion, grooves being formed between adjacent cam portions, a contact assembly comprising each a contact spring and terminal piece assembled in substantially plane-parallel position in each of such grooves, a resilient pressure element being forced between one cam portion adjacent the groove and the said contact assembly thereby maintaining the said contact spring and terminal piece in close engagement with each other and with the other cam portion adjacent the groove, the said grooves having a width between adjacent contact carriers exceeding the width of the said contact springs but the said terminal pieces having a maximum width equal to the said width of the groove, the terminal pieces being thereby maintained in the grooves in a well determined position parallel to the groove and to the wall portions of the contact carriers, the contact springs being thereby maintained out of contact with the said wall portions of the contact carriers.

4. A contactor according to claim 3, wherein a number of contact carriers comprising switch contacts are piled upon each other and attached to the said core means.

5. A contactor according to claim 1, wherein at least one of the said leg portions of the core means substantially extends beyond the said solenoid and forms an attachement for auxiliary equipment of the contactor.

6. An alternating-current contactor of the type described, comprising a substantially U-shaped magnet core means comprising two parallel leg portions and a yoke portion interconnecting such leg portions, a solenoid inserted between the said leg portions, an axial bore in the said solenoid substantially parallel to the said yoke portion, a hole in one of the said leg portions coaxial with the said bore and having a diameter exceeding the diameter of the said bore, an armature extending through and axially displaceable through the said hole and bore respectively, a core diameter substantially equal to the said bore, an air gap between the said armature and the said one leg portion formed by the space between the armature surface and the wall of the said hole, an inner and outer end of the said armature, a widened portion of magnetizable material at the outer end of the said armature, an attracted position of the said armature wherein the said inner end is in magnetic circuit-closing relation with the other of said leg portions and the said widened portion is closely approached to the said one leg portion, the said air gap being bridged by the said widened portion and the magnetic reluctance reduced when the said armature is in its attracted position.

7. In a contactor of the type described, an electromagnet, an armature translatorily displaceable in the said electromagnet, contacts operable by the said armature, and an actuating lever operatively interposed between the said armature and contacts respectively, the said armature having an actuating member, the said actuating lever being pivotably mounted and having an end engaging an opening formed between spaced parts of the said actuating member, displacement of the armature when attracted by the electromagnet being limited by a pole piece of the magnet, and displacement of the armature when tripped being limited by jamming of the said end of the actuating lever in the said opening of the actuating member.

8. A contactor of the type described, comprising a core portion comprising one single piece of stamped sheet metal and having a substantially flat side wall, extensions projecting from the said side wall forming portions of a magnetic circuit of an electromagnet and attachments respectively for mounting other contactor constituents and for fixing the contactor on a base, a plane substantially comprising the said side wall, the said extensions and contactor constituents directly mounted on the side wall projecting towards one side only of the said plane comprising the side wall, the side wall thereby forming one substantially flat side of the contractor, but forming together with its extensions a mechanical core of the contactor for mounting all contactor constituents and a magnetic core for the electromagnet of the contactor, the said leg portions of magnetic circuit extending from one end of the side wall, a solenoid being inserted between such leg portions and an armature being displaceable through the said solenoid in a direction substantially parallel to the side wall and projecting from the solenoid, contact carriers being mounted at the other end of the side wall, and an actuating lever pivoted on an axis mounted on the said side wall between the said solenoid and contact carriers, the said actuating lever being operatively interposed between the said armature and contacts accommodated in the said contact carriers.

References Cited in the file of this patent

UNITED STATES PATENTS

| | | |
|---|---|---|
| 837,037 | Case | Nov. 27, 1906 |
| 2,034,881 | Scheer | Mar. 24, 1936 |
| 2,101,429 | De Felice | Dec. 7, 1937 |
| 2,463,333 | Van Valkenburg | Mar. 1, 1949 |
| 2,692,966 | Hommel | Oct. 26, 1954 |
| 2,790,045 | Roesen | Apr. 23, 1957 |
| 2,794,093 | Morschel | May 28, 1957 |
| 2,916,585 | Moyer | Dec. 8, 1959 |
| 2,917,600 | Smith | Dec. 15, 1959 |
| 2,969,444 | Deissler | Jan. 24, 1961 |